United States Patent
Tadla et al.

(10) Patent No.: US 9,727,026 B2
(45) Date of Patent: Aug. 8, 2017

(54) MAGNETIC CENTRING DEVICE

(71) Applicant: Montres Breguet SA, L'Abbaye (CH)

(72) Inventors: Camille Tadla, Echenevex (FR); Philippe Poux, Montfaucon (FR); Jean-Philippe Rochat, Les Bioux (CH); Davide Sarchi, Renens (CH)

(73) Assignee: Montres Breguet SA, L'Abbaye (CH)

( * ) Notice: Subject to any disclaimer, the term of this patent is extended or adjusted under 35 U.S.C. 154(b) by 0 days.

(21) Appl. No.: 14/526,864

(22) Filed: Oct. 29, 2014

(65) Prior Publication Data
US 2015/0177695 A1 Jun. 25, 2015

(30) Foreign Application Priority Data

Dec. 19, 2013 (EP) .................................... 13198643

(51) Int. Cl.
| | | |
|---|---|---|
| G04B 17/32 | (2006.01) | |
| G04C 5/00 | (2006.01) | |
| F16C 32/04 | (2006.01) | |
| G04B 31/00 | (2006.01) | |

(52) U.S. Cl.
CPC .......... *G04C 5/005* (2013.01); *F16C 32/0414* (2013.01); *G04B 17/32* (2013.01); *G04B 31/00* (2013.01); *F16C 2370/00* (2013.01)

(58) Field of Classification Search
CPC ......... G04B 17/32; G04B 31/00; F16C 32/04; F16C 32/0414; F16C 2370/00; G04C 5/005
USPC ........................................................ 368/293
See application file for complete search history.

(56) References Cited

U.S. PATENT DOCUMENTS

| | | | | | |
|---|---|---|---|---|---|
| 3,534,296 | A | * | 10/1970 | Carr ....................... | H01P 1/387 333/1.1 |
| 4,075,518 | A | * | 2/1978 | Koehler ............... | H02K 37/125 310/156.32 |
| 4,205,244 | A | * | 5/1980 | Fukushima ........... | H02K 37/16 310/162 |
| 5,226,020 | A | * | 7/1993 | Li ........................... | A61N 2/06 368/10 |
| 5,686,772 | A | * | 11/1997 | Delamare ............. | F04D 19/048 310/90 |
| 5,757,098 | A | | 5/1998 | Higuchi et al. | |
| 5,923,109 | A | | 7/1999 | Higuchi et al. | |

(Continued)

FOREIGN PATENT DOCUMENTS

| | | |
|---|---|---|
| DE | 10 2008 035 509 A1 | 2/2010 |
| EP | 0 695 027 A1 | 1/1996 |

OTHER PUBLICATIONS

Electronic translation of Popov, DE 102008035509, translated Jul. 16, 2015.*

(Continued)

*Primary Examiner* — Sean Kayes
(74) *Attorney, Agent, or Firm* — Oblon, McClelland, Maier & Neustadt, L.L.P.

(57) ABSTRACT

Magnetic centring device for micromechanical applications, including a magnet and a magnetic flux conduction device arranged on the magnet, the magnetic flux conduction device including a central magnetic flux conduction disc made of a magnetic material having high magnetic permeability, and a peripheral area arranged around the central disc and separated from the central disc by a non-zero distance.

30 Claims, 3 Drawing Sheets

(56) References Cited

U.S. PATENT DOCUMENTS

| | | | |
|---|---|---|---|
| 6,657,344 B2* | 12/2003 | Post | F16C 32/0412 |
| | | | 310/90.5 |
| 2003/0117031 A1* | 6/2003 | Wang | F16C 39/063 |
| | | | 310/90.5 |
| 2008/0112275 A1* | 5/2008 | Born | G04C 3/004 |
| | | | 368/319 |
| 2009/0101284 A1* | 4/2009 | Higuma | H01J 37/32532 |
| | | | 156/345.51 |
| 2009/0160279 A1* | 6/2009 | Baur | H02N 15/00 |
| | | | 310/90.5 |
| 2012/0112589 A1* | 5/2012 | Marechal | F16C 32/0408 |
| | | | 310/90.5 |
| 2012/0113767 A1* | 5/2012 | Marechal | G04B 31/02 |
| | | | 368/287 |

OTHER PUBLICATIONS

Translation—de102008035509—espacenet.com—Sep. 29, 2016.*
European Search Report issued Jun. 4, 2014 in European Application 13198643, filed on Dec. 19, 2013 (with English Translation).

* cited by examiner

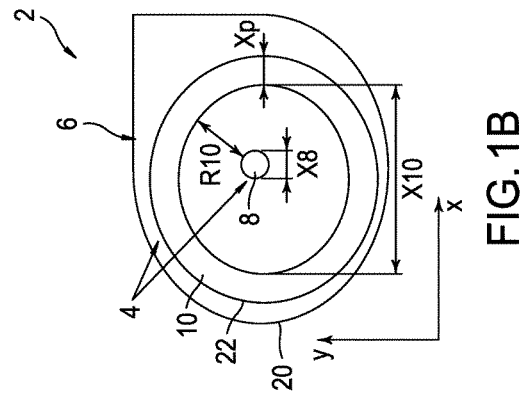
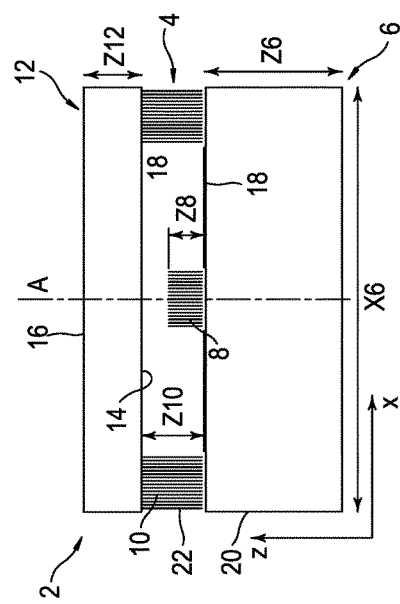

MAGNETIC CENTRING DEVICE

BACKGROUND

This application claims priority from European Patent application No. 13198643.2 filed on Dec. 19, 2013, the entire disclosure of which is hereby incorporated herein by reference.

The present invention concerns a magnetic centring device for components of small size, particularly for centring a pivotally mounted component. A particular field of application of the invention concerns timepiece mechanisms.

The introduction of active magnetic components, such as permanent magnets and parts made of soft ferromagnetic material, into timepiece mechanisms represents a significant technical challenge because of the extremely reduced dimensions and high spatial precision required to accomplish chronometric functions in a reliable manner.

Most natural or synthetic magnetic materials are inhomogeneous on a millimeter scale or less, which makes it difficult to control magnetic field localization and intensity on this scale. In particular, permanent micro-magnets having the highest magnetic energy intensity, for example SmCo or NdFeB micro-magnetics, are typically manufactured from powders of chemical elements from the rare earth family, their granular structure having dimensions of between 1 and 100 microns. The homogeneity of the magnetic field generally decreases as it approaches the grain scale.

The utilisation of magnetic components for rotating elements of timepiece movements or mechanisms, for example as described in WO Patent No 2012/0662524 and WO Patent No 2012/062523 or of other micromechanical mechanisms, such as measuring or control instruments, is advantageous because it makes it possible to create large localized forces accompanied by low friction.

BRIEF SUMMARY

It is an object of the invention to provide a magnetic centring device for components of small size, on the millimeter scale or less, which is accurate and reliable.

It is a particular object of the invention to provide a magnetic centring device for a pivotally mounted component.

It is a particular object of the invention to provide a magnetic centring device for a timepiece mechanism component, and a timepiece mechanism including a magnetic centring device.

It is advantageous to provide a magnetic centring device integrating a bearing with very low wear for a rotating member.

It is advantageous to provide a magnetic centring device integrating a high efficiency bearing.

It is advantageous to provide a very compact and robust magnetic centring device.

It is advantageous to provide a magnetic centring device which can be manufactured in a simple and economic manner.

The integration of magnetic flux localization elements in active magnetic components according to the present invention improves and extends the use of magnetic components, particularly magnetic timepiece components.

BRIEF DESCRIPTION OF THE DRAWINGS

Other advantageous objects and aspects of the invention will appear upon reading the following detailed description of embodiments, and the annexed drawings, in which:

FIG. 1 is a diagram of an embodiment of a magnetic centring device according to the invention, FIG. 1a illustrating a cross-sectional view and FIG. 1b a top view of said device.

DETAILED DESCRIPTION

Figure 2:
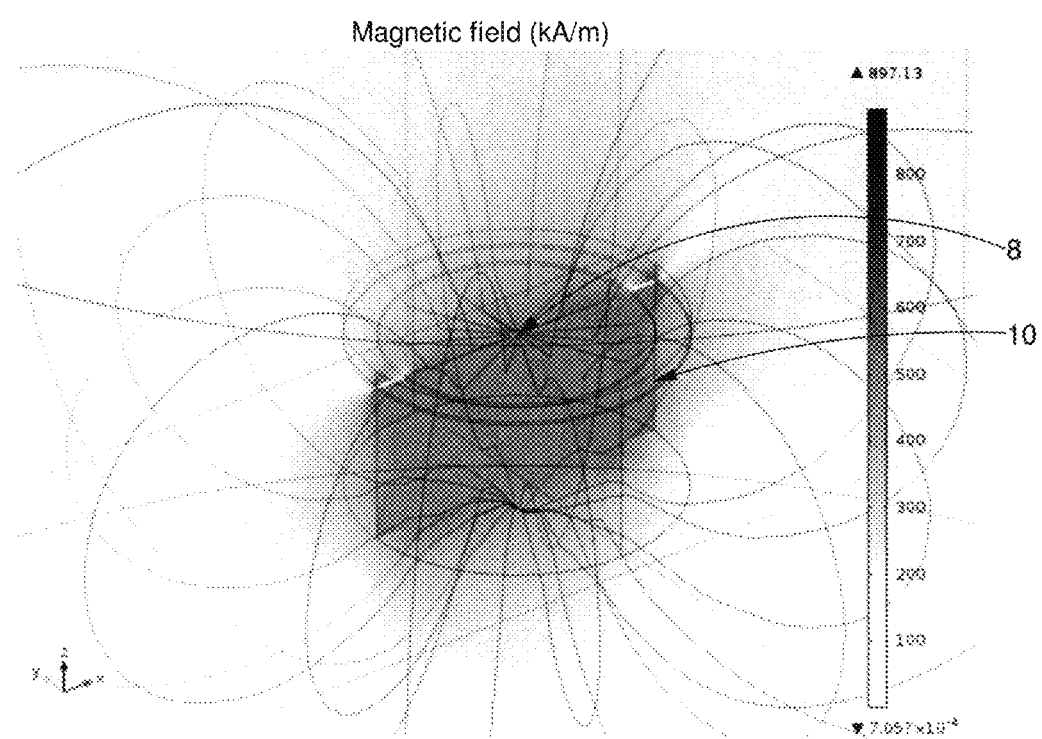
FIG. 2 is a diagram illustrating the magnetic field of a magnetic centring device according to one embodiment of the invention.

Referring to the Figures, particularly FIGS. 1a and 1b, a magnetic centring device 2 according to an embodiment of the invention includes a magnet 6, a non-magnetic support 12 and a magnetic flux conduction device 4 arranged between the magnet and the non-magnetic support. Magnet 6 may be made of a material exhibiting high magnetic energy density, for example SmCo or NdFeB, which are typically manufactured by known methods from powders of chemical elements from the rare earth family. Within the scope of the invention, it is possible, in another embodiment, to omit the non-magnetic support.

For applications envisaged by the invention, the thickness Z6 of the magnet is of the order of a millimeter or less, for example between 0.2 and 0.7 millimeters. For applications requiring a very large magnetic force, height Z6 of the magnet could also be of the order of several millimeters, for example from 1 to 5 millimeters. For applications envisaged by the invention, the mean width X6 of the magnet, or its diameter if it is a cylindrical magnet, is of the order of magnitude of a millimeter, typically less than 5 millimeters and in numerous applications of the order of a millimeter or less. According to a preferred embodiment, magnet 6 has a prismatic shape, with a profile that is circular, polygonal, square, and rectangular or of other irregular shapes as illustrated in FIG. 1b.

For most applications, the profile of the magnet is preferably circular.

Non-magnetic support 12 is made of a non-magnetic material, the choice of material depending, amongst other things, on the application envisaged for magnetic centring device 2. Non-magnetic support 12 protects the magnetic flux conduction device 4 and has a work surface 16 against which a member (not illustrated) can bear.

One of the main applications of the magnetic centring device according to one embodiment of the invention includes an of axial bearing for rotating or pivoting mobile parts, the axial bearing also having the function of centring the rotating mobile member on an axis A defined by magnetic flux conduction device 4. The magnetic centring device according to the invention may also be used for the centring or positioning of non-rotating parts, and in particular static parts. In such case, it is also possible to envisage using the magnetic centring device according to the invention to define a reference point, for example for a mobile part.

In applications where the non-magnetic support 12 has a work surface 16 for a mobile support member (not illustrated), for example as an axial bearing for a rotating pivoting member, the material is selected from among materials having good mechanical properties, and, in particular, having a high deformation limit and breaking limit in addition to good tribological properties. Examples of materials answering these criteria include crystalline stones such as sapphires, for example ruby or diamond stones. For mobile timepiece parts, ruby stones will preferably be used as the material for non-magnetic support 12.

In a preferred embodiment, the non-magnetic support is formed of a homogeneous material, for example a non-magnetic support consisting of a sapphire disc for example a ruby stone. However, within the scope of the invention, the non-magnetic support may also be formed of a non-homogeneous structure formed of several layers of different materials. For example, in a variant, non-magnetic support 12 may include a first material as the main material for the support body, a second material with high hardness and/or good tribological properties forming an outer layer including work surface 16. For example, a first layer maybe made of a material formed by deposition using known deposition techniques on magnetic flux conduction device 4 and a second layer may be made of another material. This second layer may, for example, be a diamond layer, also formed by deposition techniques such as by plasma deposition or CVD (chemical vapour deposition).

The non-magnetic support may also be in the form of a single part such as a ruby or other cut stone or of a part made of ceramic material.

The axial thickness Z12 of the non-magnetic support is preferably of the order of magnitude of a millimeter or less, preferably less than 0.5 millimeters. For most applications, thickness Z12 is as low as possible taking into account the stresses exerted on the non-magnetic support and the resistance of its constituent materials, in addition to the limits of the manufacturing techniques used to produce the device. This makes it possible to obtain the smallest possible axial distance separating work surface 16 from magnetic flux conduction device 4 $t$ for the highest possible magnetic field intensity.

Work surface 16 may be plane or essentially plane. However, in variants, the work surface may have a non-plane shape, for example a convex shape, or a concave shape, these shapes depending upon other things on the application envisaged for the magnetic centring device according to the invention.

A convex shape may be useful, for example, when the magnetic centring device is arranged on the end of a pivot pin or when the member (not illustrated) bearing against the work surface has a plane or concave surface, in order to form a contact point between the member and the work surface.

In one embodiment, the width of the non-magnetic support may be identical or essentially match width X6 of the magnet. It is, however, possible in variants to have a non-magnetic support 12 having a width and/or a profile that is different from the width and from the profile of the magnet. For example, in a variant, the non-magnetic support may form an integral or integrated part of a larger support element having other functions and/or forming part of a member of another device.

Magnetic flux conduction device 4 includes a central magnetic flux conduction disc 8 made of a magnetic material M1 and a peripheral area 10 made of a material M2 which may, depending on the variant, be identical to material M1 of the central disc, or be made of a different material from the material of the central disc.

Peripheral area 10 is arranged around the central disc and is separated from the central disc by a distance R10. In an advantageous embodiment, the peripheral area is not in contact with the central disc. In a variant, the peripheral area and the central disc are connected by one or more bars, spokes or bridges of different shapes. The peripheral area and the central disc may also be connected by a bar? or a connecting plate whose thickness is equal to or less than one tenth of the thickness of the central disc. Distance R10 may be of the order of magnitude of half the width X6 of the magnet less the radial thickness Xp of the material forming the peripheral area and the radius (X8/2) of central disc 8. In one embodiment, the peripheral area is in proximity to the outer periphery 20 of magnet 6 or to the outer periphery 22 of non-magnetic support 12. The distance R8 separating the central disc from the peripheral area is, in preferential embodiments, within a range of between 0.45 and 0.2 times the mean magnet width X6. If the magnet has a width of around 1 millimeter, the distance separating the peripheral area from the central disc is preferably between 0.45 and 0.2 millimeters.

In a preferential embodiment, the peripheral area 10 forms a closed, preferably circular, circuit around the central disc, however the peripheral area may also have the shape of a triangle or regular polygon or a square, the central disc being preferably arranged at the centre of peripheral area 10 within the limit of manufacturing tolerances. In variants (not illustrated), peripheral area 10 may also be formed of a non-closed circuit surrounding the central disc, or include a plurality of points, arcs of a circle, or sections of materials M2 that are discontinuous but distributed around the central magnetic flux conduction disc 8.

In a preferred embodiment, material M2 of peripheral area 10 is advantageously a magnetic flux conduction material, particularly having high magnetic permeability. In this embodiment, material M2 may advantageously be the same magnetic flux conduction material used for central magnetic flux conduction disc 8. In a variant, it is, however, possible to have a material M2 having low magnetic permeability, particularly a non-magnetic material and in that case the peripheral area has a support and/or spacer function defining the axial distance Z10 between one surface of magnet 6 and an inner surface 14 of non-magnetic surface 12.

In a preferred embodiment, magnetic flux conduction device 4 is formed by a deposition technique, either on surface 18 of the magnet, or on the inner surface 14 of the non-magnetic support. Various known state of the art deposition techniques may be used and will not therefore be described in detail. One of the known methods which may advantageously be used in one embodiment of the invention includes the deposition of a layer of material M1 forming the central disc, possibly made of another material M2 forming the peripheral area if the latter is different from the material of the central disc, followed by a lithography method to form the central disc and the space R8 separating central disc 8 from peripheral area 10. According to a variant, the method of manufacturing the central disc and the peripheral area may include laser machining a layer of material forming the central disc and the peripheral area. According to a variant, the non-magnetic support 12 may include a central hollow, for example a laser machined hollow in a hard material such as a sapphire stone or a ceramic part, the magnetic material of the central disc being deposited in the hollow, for example by galvanic deposition, possibly accompanied by a mechanical or chemical attachment method to form the final shape of the central disc and of the peripheral area. The same method can also be used to form the peripheral area by forming a hollow for the peripheral area. The hollow formed in the support may also include the central disc and the peripheral area, the space between the central part and the peripheral area being machined, removed by chemical etching, or by a laser method. In a preferred embodiment, the hollow in non-magnetic support 12 may be inscribed in a truncated cone having the smallest possible diameter towards the bottom of the hollow.

The space separating the peripheral area from the central disc may be filled with a gas, or, in a preferred variant, filled with a non-magnetic solid material, namely a material having low magnetic permeability, for example close to a value of 1.

Material M1 of central disc 8, where appropriate of peripheral area 10 when this is the same material, may advantageously be made of nickel or cobalt or of nickel or cobalt alloys. In one embodiment, material M1 and/or material M2 is entirely formed of nickel. In another variant, these elements are entirely made of nickel-phosphorus with a phosphorus percentage less than or equal to 11%. According to yet another variant, the flux conduction element is entirely formed of cobalt. According to another variant, the flux conduction element may be entirely made of a magnetically soft material, characterized by a coercive field$_c$ of less than 5 kA/m and a maximum permeability $\mu_R$ equal to or greater than 100.

FIG. 2 illustrates the magnetic field lines resulting from a magnetic centring device according to FIG. 1. The field lines are localized in the area of central disc 8, hardly visible on the real scale. Central disc 8 in this example has a diameter equal to 10 microns and a thickness equal to 10 microns. Peripheral area 10 has a circular crown shape with an outer diameter equal to 1 mm and an inner diameter equal to 0.8 mm and a thickness equal to 10 microns. The disc and the peripheral area are made of nickel. Magnetic flux conduction device 4 is inserted between a permanent magnet made of NdFeB having a diameter equal to 1 mm and thickness equal to 0.5 mm and a ruby stone having the same diameter and a thickness equal to 0.05 mm.

Figure 3:
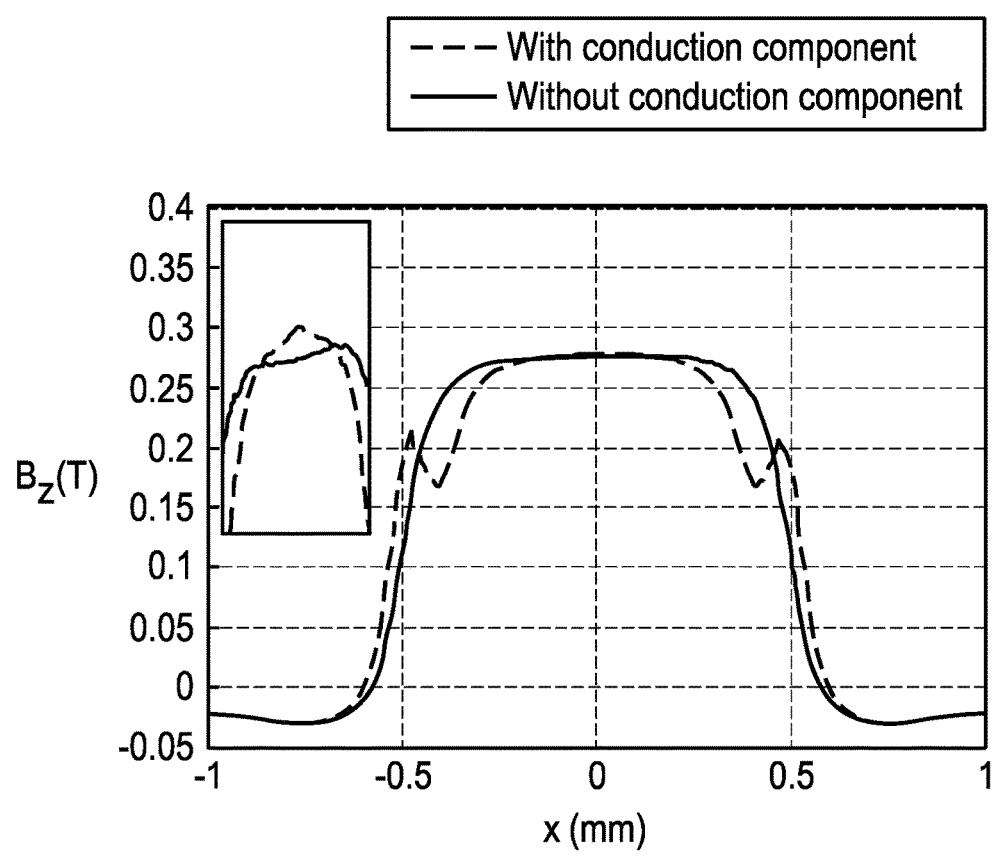
FIG. 3 is a graph illustrating the amplitude of the magnetic field in the presence and in the absence of a magnetic flux localization component of a magnetic centring device according to an embodiment of the invention.

The remanent field of the permanent magnet is 1 T and the magnetisation thereof is inhomogeneous and 0.2 mm off-centre relative to the centre of the magnet. The magnetic field on the outer surface of the ruby stone is shown in FIG. 3. In FIG. 3, the magnetic field amplitude is measured in a direction along the x axis in a cross-section along the axis y=0, z=0.31 mm in the presence and in the absence of a magnetic flux conduction element B. The maximum field corresponds to the central nickel disc which plays the part of a conductor and localizer of the magnetic flux exiting the magnet. In the absence of a conduction element, the maximum magnetic field on the stone would be shifted by approximately 0.2 mm, because of the eccentric magnetisation of the permanent magnet.

According to an advantageous embodiment, the magnetic flux conduction element includes a circular central disc having a diameter equal to or less than 10 microns and having a thickness equal to or less than 7 microns.

According to an advantageous embodiment, the magnetic flux conduction element includes a central disc which may be inscribed in a truncated cone having a first surface with a diameter equal to or less than 10 microns and a second surface with a diameter equal to or less than 50 microns and a height equal to or less than 50 microns, the largest surface being the surface closest to magnet 6.

According to an advantageous embodiment, the minimum distance between the central disc and the peripheral area is equal to or greater than 0.2 mm.

According to an advantageous embodiment, the peripheral area has a circular crown shape.

According to an advantageous embodiment, the peripheral area is completely disconnected from the central disc.

According to a second embodiment, a non-magnetic connecting element exists between the peripheral area and the central disc.

According to one embodiment, the peripheral area and the disc are made of the same material and are connected by a bar or connecting plate having a thickness equal to or less than one tenth of the thickness of the disc.

Preferably, the magnet is a permanent rare earth magnet.

According to an advantageous embodiment, materials M1 and M2 are identical.

According to an advantageous embodiment, the flux conduction element is made entirely of nickel.

According to a variant, the magnetic flux conduction device is entirely made of nickel-phosphorus with a phosphorus percentage lower than or equal to 11%.

According to a variant, the magnetic flux conduction device is entirely made of cobalt.

According to a variant, the magnetic flux conduction device is entirely made of a magnetically soft material, characterized by a coercive field$_c$ of less than 5 kA/m and a maximum permeability $\mu_R$ equal to or less than 100.

According to another embodiment, material M1 is magnetic and material M2 is non-magnetic.

According to another embodiment, the non-magnetic support is omitted.

According to an advantageous manufacturing method, the magnetic flux conduction device is created by deposition on the surface of the magnet.

According to another advantageous manufacturing method, the magnetic flux conduction device is created by deposition on the surface of the non-magnetic support.

According to an advantageous manufacturing method, the magnetic flux conduction device is obtained by lithography from a uniform layer of material.

According to an advantageous manufacturing method, the surface of the non-magnetic support is hollowed by laser machining, material M1 is then uniformly deposited by galvanic deposition on the hollowed surface and the magnetic flux conduction device is finally formed inside the hollow, by mechanical or chemical etching of the deposited material M1. According to a preferred manufacturing method, the hollow in the magnetic support may be inscribed in a truncated cone having the smallest possible diameter towards the bottom of the hollow.

In horological applications, a magnetic centring device according to the invention may advantageously be used in:
a mechanical watch movement, particularly for the sprung balance and the escapement;
a magnetic pivot for various mobile parts such as parts of the gear train, escapement or balance;
a chronograph (oscillator, mobile and antiflutter);
a date mechanism (semi-instantaneous and instantaneous);
a striking mechanism (hammer-gongs, pin barrels, regulators);
a turning fork watch (particularly with a Clifford magnetic escapement).

The invention may also be used in measuring or control instruments and other instruments including rotating micromechanical components, for example miniature gyroscopes.

Amongst its advantages, a magnetic centring device according to the invention:
ensures the localization of the magnetic flux exiting a magnetic component of horological size with a precision of less than 10 microns;
can be integrated in all active magnetic components (permanent magnets, soft ferromagnetic, antiferromagnetic components etc. . . . ), regardless of the magnetic energy density, magnetic remanence and other magnetic properties of the component;

can be directly integrated in already developed components within the watchmaking industry, for example in magnetic pivots;

ensures its magnetic flux localization function regardless of various climatic conditions, within a very high temperature range (depending on the material selected, within a range greater than −200° C./+150° C.).

ensures magnetic flux localization regardless of its intensity.

is robust to shocks.

LIST OF REFERENCES

Magnetic centring device 2
Magnetic flux conduction device 4
Central magnetic flux conduction disc 8
Magnetic material M1
Peripheral area 10
Material M2
Lateral periphery 22
Non-magnetic support 12
Inner surface 14
Outer surface 16 (work surface)
Magnet 6
Inner surface 18
Lateral periphery 20

What is claimed is:

1. A magnetic centring device for micromechanical applications, comprising:
a magnet;
a magnetic flux conduction device arranged on the magnet, the magnetic flux conduction device including a central magnetic flux conduction disc made of a magnetic material having a maximum relative magnetic permeability equal to or greater than 100, and a peripheral area arranged around the central disc and separated from the central disc by a non-zero distance; and
a non-magnetic support made of a material having low magnetic permeability, the non-magnetic support being positioned above the magnet,
wherein the central magnetic flux conduction disc and the peripheral area are positioned between an upper surface of the magnet and a lower surface of the non-magnetic support, the peripheral area being a magnetic flux conduction material arranged on the upper surface of the magnet or on the lower surface of the non-magnetic support.

2. The device according to claim 1, wherein the central magnetic flux conduction disc and the peripheral area are positioned entirely between the upper surface of the magnet and the lower surface of the non-magnetic support in an axial direction of the device.

3. The device according to claim 1, wherein the peripheral area is not in contact with the central disc.

4. The device according to claim 1, wherein the peripheral area and the central disc are connected by one or more bars or by a connecting plate whose thickness is equal to or less than one tenth of the thickness of the central disc.

5. The device according to claim 1, wherein the peripheral area is made of a magnetic material having a maximum relative magnetic permeability equal to or greater than 100.

6. The device according to claim 1, wherein the peripheral area is made of an identical material to the material of the central disc.

7. The device according to claim 1, wherein the material of the magnet is SmCo or NdFeB.

8. The device according to claim 1, wherein the distance separating the central disc from the peripheral area is in a range of between 0.45 and 0.2 times the mean width of the magnet of the outer diameter of the peripheral area.

9. The device according to claim 1, wherein the peripheral area forms a closed circuit around the central disc.

10. The device according to claim 1, wherein the peripheral area has a circular shape.

11. The device according to claim 1, wherein the central disc has a cylindrical shape.

12. The device according to claim 1, wherein the central disc has a truncated cone shape.

13. The device according to claim 1, Wherein the minimum distance between the central disc and the peripheral area is equal to or greater than 0.2 mm.

14. The device according to claim 1, wherein the central disc is inscribed in a cylinder having a diameter of between 5 and 30 microns and a thickness of between 5 and 50 microns, and the peripheral area is inscribed in a cylindrical crown having an inner diameter of between 0.5 and 2 mm, and a thickness of between 5 and 30 microns.

15. The device according to claim 1, wherein the central disc is inscribed in a truncated cone having a first surface whose diameter is equal to or less than 10 microns and a second surface whose diameter is equal to or less than 50 microns and a height equal to or less than 50 microns, the second surface being disposed closer to the magnet than the first surface.

16. The device according to claim 1, wherein the magnet has a diameter of between 0.5 and 3 mm and a thickness of between 0.2 and 1 mm.

17. The device according to claim 1, wherein the magnetic flux conduction device is formed by a deposition technique, either on the upper surface of the magnet, or on the lower surface of the non-magnetic support.

18. The device according to claim 1, wherein the material of the central disc and of the peripheral area is made of nickel or of cobalt or a nickel alloy or a cobalt alloy.

19. The device according to claim 1, wherein the magnetic flux conduction device is obtained by lithography from an essentially uniform layer of material.

20. The device according to claim 1, wherein the non-magnetic support protects the magnetic flux conduction device and has a work surface against which a mobile member can bear.

21. The device according to claim 20, wherein the work surface is made of a material selected from a group of materials including sapphires, ruby stones, and diamond.

22. The device according to claim 1, wherein the upper surface of the non-magnetic support is hollowed by laser machining, the material forming the central disc is then deposited in a layer by galvanic deposition on the hollowed upper surface and the magnetic flux conduction device is finally formed inside the hollow by mechanical or chemical etching of the deposited material.

23. The device according to claim 1, wherein the thickness of the non-magnetic support is between 0.03 and 0.6 mm.

24. The device according to claim 1, wherein the device is configured as a magnetic bearing for a pivoting or rotating mobile member of a timepiece mechanism.

25. A watch movement, comprising:
a magnetic centring device, including a magnet, a magnetic flux conduction device arranged on the magnet, and a non-magnetic support made of a material having low magnetic permeability, the non-magnetic support being positioned above the magnet, the magnetic flux conduction device including a central magnetic flux conduction disc made of a magnetic material having a maximum relative magnetic permeability equal to or greater than 100, and a peripheral area arranged around the central disc and separated from the central disc by a non-zero distance, the central magnetic flux conduction disc and the peripheral area being positioned between an upper surface of the magnet and a lower surface of the non-magnetic support, the peripheral area being a magnetic flux conduction material arranged on the upper surface of the magnet or on the lower surface of the non-magnetic support.

26. A watch, comprising:
a magnetic centring device, including a magnet, a magnetic flux conduction device arranged on the magnet, and a non-magnetic support made of a material having low magnetic permeability, the non-magnetic support being positioned above the magnet, the magnetic flux conduction device including a central magnetic flux conduction disc made of a magnetic material having a maximum relative magnetic permeability equal to or greater than 100, and a peripheral area arranged around the central disc and separated from the central disc by a non-zero distance, the central magnetic flux conduction disc and the peripheral area being positioned between an upper surface of the magnet and a lower surface of the non-magnetic support, the peripheral area being a magnetic flux conduction material arranged on the upper surface of the magnet or on the lower surface of the non-magnetic support.

27. A magnetic centring device for micromechanical applications, comprising:

a magnet; and
a magnetic flux conduction device arranged on the magnet, the magnetic flux conduction device including a central magnetic flux conduction disc made of a magnetic material having a maximum relative magnetic permeability equal to or greater than 100, and a peripheral area arranged around the central disc and separated from the central disc by a non-zero distance, the central magnetic flux conduction disc and the peripheral area being formed directly on an upper surface of the magnet, the peripheral area being a magnetic flux conduction material.

28. The device according to claim 27, further comprising:
a non-magnetic support positioned above the central magnetic flux conduction disc and the peripheral area,
wherein the surface of the magnet on which the central magnetic flux conduction disc and the peripheral area are formed is an upper surface of the magnet and the peripheral area extends from the upper surface of the magnet to directly contact a lower surface of the non-magnetic support.

29. The device according to claim 28, wherein the central magnetic flux conduction disc and the peripheral area are positioned entirely between the upper surface of the magnet and the lower surface of the non-magnetic support in an axial direction of the device.

30. The device according to claim 28, wherein the central magnetic flux conduction disc does not contact the lower surface of the non-magnetic support.

* * * * *